United States Patent [19]

Densmore et al.

[11] 4,291,199
[45] Sep. 22, 1981

[54] COMMUNICATION SYSTEM TRACKING ARRANGEMENT

[75] Inventors: Wayne Densmore, Eatontown; Thomas M. Quinn, Little Silver, both of N.J.

[73] Assignee: Bell Telephone Laboratories, Incorporated, Murray Hill, N.J.

[21] Appl. No.: 24,724

[22] Filed: Mar. 28, 1979

[51] Int. Cl.³ .................. H04M 1/22; H04M 3/22; H04M 3/42

[52] U.S. Cl. .................. 179/18 AB; 179/18 AD; 179/18 B; 179/99 LS

[58] Field of Search .......... 179/18 AB, 18 AD, 18 B, 179/18 D, 99 LS, 27 FH, 27 FG, 27 D, 18 BE, 18 BG

[56] References Cited

U.S. PATENT DOCUMENTS

| | | | |
|---|---|---|---|
| 3,253,089 | 5/1966 | Breen et al. | 179/27 FH |
| 3,519,757 | 7/1970 | Anderson et al. | 179/18 J |
| 3,573,389 | 4/1971 | Greenstein et al. | 179/18 BE |
| 3,576,400 | 4/1971 | Schluter | 179/18 BE |
| 3,704,346 | 11/1972 | Smith et al. | 179/18 BE |
| 3,723,654 | 3/1973 | Bunce et al. | 179/18 AD X |
| 3,736,382 | 5/1973 | Braun et al. | 179/18 BE |
| 3,928,729 | 12/1975 | Nielson | 179/18 BG |
| 4,046,972 | 9/1977 | Huizinga et al. | 179/99 |
| 4,109,113 | 10/1977 | Allison et al. | 179/99 |
| 4,125,748 | 10/1977 | Nahabedian et al. | 179/99 |

OTHER PUBLICATIONS

"Dimension Spectrum Expands with Custom Telephone Service", Horenkaamp et al., *Bell Laboratories Record*, vol. 54, No. 10, Nov. 1976, pp. 274–280.

*Primary Examiner*—Thomas W. Brown
*Attorney, Agent, or Firm*—David H. Tannenbaum

[57] ABSTRACT

A communication system call tracking arrangement is disclosed which allows a telephone station user to selectively determine the busy-idle status of any other telephone station served by the same system, without utilizing the communication links between the stations. In operation, the inquiring station has the capability of selecting a target station and for receiving a continuous visual indication of the busy-idle status of the selected target station. In one embodiment, it is possible to selectively enable the tracking feature so that an audible signal is provided at the inquiring station when the target station makes a busy-idle status transition.

23 Claims, 6 Drawing Figures

COMMUNICATION SYSTEM TRACKING ARRANGEMENT

BACKGROUND OF THE INVENTION

This invention relates to communication system call tracking control arrangements and more particularly to an arrangement for controlling the tracking feature in a stored program controlled communication system.

In communication systems where the users share a community of interest, as for example in a business communication system, it often happens that a call is placed to a station where the user is busy with another communication call. In some systems it is possible that the second call will result in ringing, or other signalling devices, becoming activated at the called station requiring the called party to take some action even though that party is involved in another call. Thus a need exists for an arrangement which allows a calling party to become immediately connected to a busy station as soon as the busy station becomes idle without priorly disturbing the busy station.

However, even in situations where the subsequent call is not completed and busy tone is returned, problems exist. Primarily these problems concern the continued attempts on the part of the calling party to place a call to the called busy station or to a called line pool. Much time is wasted by redialing the connection only to find the called station, or line pool, again busy. Some systems have been designed whereby the number of the last dialed call is stored in a memory and periodically retried. However, it often happens that when the originally called party becomes free the original calling party is then busy. Further problems exist in such systems since the calling party must remain close to the calling station so as to be available when the connection is finally established to the called station.

Thus, a need exists in the art for a feature which allows any station in a communication system to determine the busy-idle status of a selected other station served by the same system independent of a communication path to that other station.

There is a further need in the art for such a system of tracking the busy-idle status of selected stations and for receiving a signalling indication when the tracked party goes from the off-hook to the on-hook condition. There is a further need for such a system which operates to establish a communication connection to the tracked station jointly upon receiving such an off-hook to on-hook transition and upon the tracking station going off-hook.

There is also a need for a call tracking arrangement which provides both a visual status and audible determination when a tracked line pool becomes idle and available for use. There is also a need in the art for an arrangement which allows a called station which is in the "don't answer mode" to receive incoming calls immediately upon leaving that mode simply by making an on-hook to off-hook transition.

SUMMARY OF THE INVENTION

One of the buttons on the telephone set is designated as a tracking button and is used, under control of that station to track the busy-idle status of a target station. A lamp associated with the tracking button provides a visual indication of the busy-idle status of the selected target station. When the target station goes on-hook following an off-hook condition the tracking station, by operating the tracking button and going off-hook establishes a call to the target station.

In operation the tracking subscriber operates an intercom or other special button and dials a "prepare to program" digit such as the #. The tracking subscriber then pulses the number of the target station or line pool into the system by means of the key pad on the telephone instrument. The lamp associated with the tracking button will provide the tracking subscriber with the communication status of the target station without interference or connection with the communication path of the target station. When the tracked station makes an off-hook to on-hook transition, an audible as well as visual indication is provided to the tracking station to alert the user to the changed status. By operating the tracking button at the tracking station a communication path is established from the tracking station to the target station without further dialing.

When a line pool is being tracked and one of the lines in the line pool becomes idle a visual indication is provided to the calling station and an alerting signal is provided. This alerting signal is provided each time a line in the line pool becomes idle so that a calling subscriber need not immediately attempt to seize the idle line but may do so at his convenience at a later time. This is possible since the busy-idle status of the line pool will be continuously displayed whenever the line pool has an idle line available.

The calling subscriber by using prime line preference on the tracking button or by preselecting the track button may, upon hearing the alert signal, simply lift the receiver and a connection will be immediately placed to the tracked station or to an available one of the lines in the tracked line pool.

Thus, utilizing the tracking feature as discussed above, it is possible that when a person who has been absent from his telephone station for a period of time returns to his office the telephone receiver may be lifted and replaced (making an on-hook to off-hook to on-hook transition) thereby automatically alerting all those callers who have been tracking the status of the unattended telephone.

A further advantage of such a tracking arrangement is that it is possible to immediately call a party who has been busy on the telephone with a minimum of effort on the part of the calling party since the calling party need not continually try to dial the called station. Under such an arrangement it is possible to reduce the number of line pools necessary for a given installation since customers need not continue dialing but are content to wait for an idle line knowing that as soon as such a line is available they will be automatically notified.

BRIEF DESCRIPTION OF THE DRAWINGS

The foregoing features and objectives together with the operation and utilization of the present invention will be more apparent from the following description, taken in conjunction with the drawing, in which.

GENERAL DESCRIPTION—BACKGROUND

Before beginning a general discussion of the specific features claimed it may be helpful to review in general terms the operation of an overall system in which the claimed feature can be utilized. It should be borne in mind that such a feature can be used in any number of similar type systems and thus background information on only one type of system will be presented. In addition, since communication system features may be used with different types of systems each dependent on different hardware constraints and upon different programming techniques, no attempt will be made to detail all of the steps used to control the overall system, as such would cloud the issue and unnecessarily lengthen this specification. Quantities mentioned were engineered for particular time and memory requirement and will not be the optimum for all such systems.

It will of course be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein, this patent specification will concentrate on providing an understanding of the problems and constraints typically found in a communication system where the feature may be used. The patent specification will provide the necessary logical steps necessary for the implementation and blending of the described feature into such a larger system, having many such features.

TYPICAL OVERALL SYSTEM OPERATION

Figure 1:
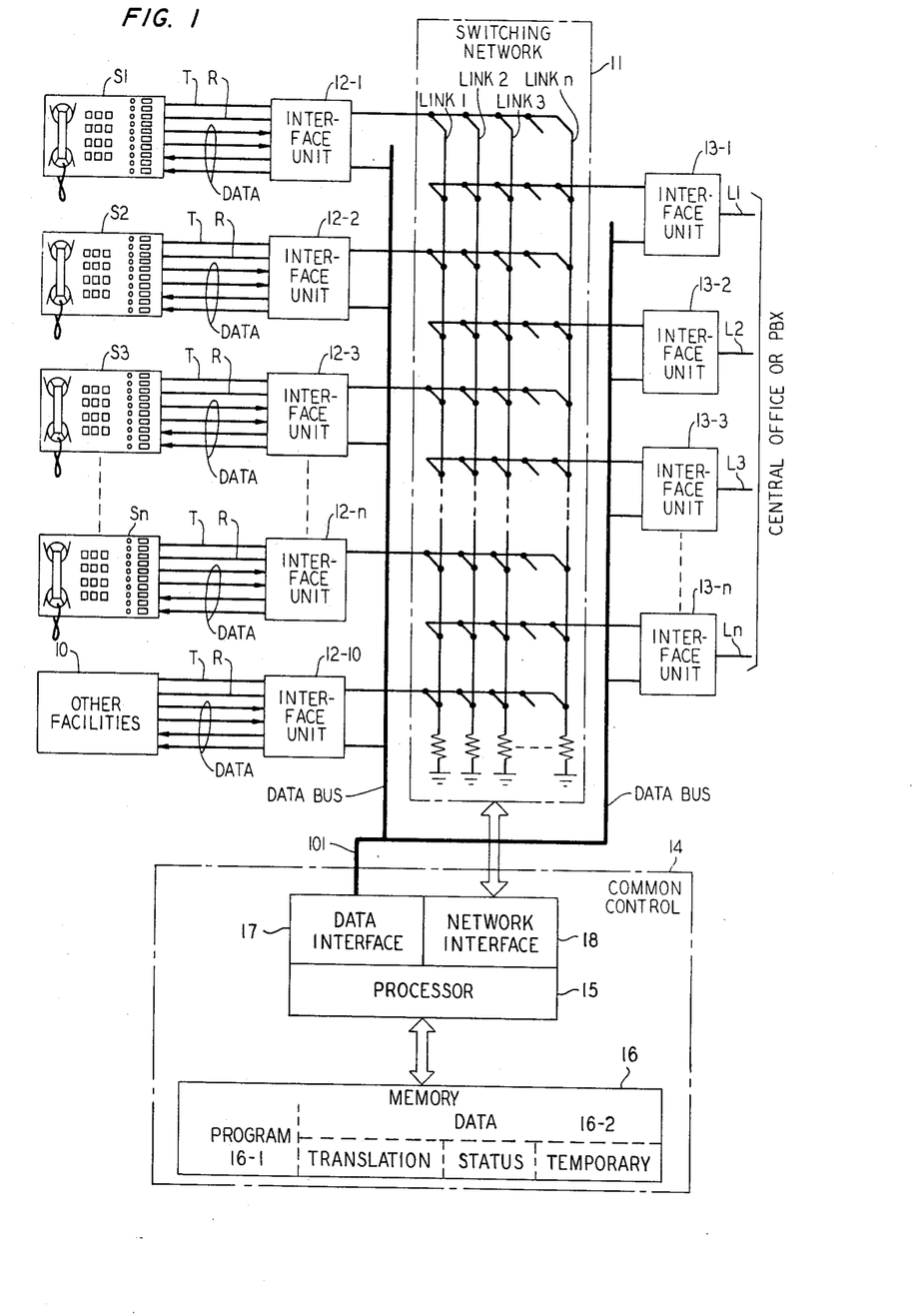
FIG. 1 shows an overall system configuration having several multibutton telephone stations.

One such communication system where the structure claimed herein can be used is a station oriented solid-state, stored program control, business communication system. FIG. 1 shows a block diagram of such a system which combines the usual key system features (hold, visual indication, etc.) with many features only recently available.

These features are fully detailed in four priorly filed U.S. patent specifications, each directed to a different operational feature of a communication system. These patent applications are Allison et al, Ser. No. 847,214, filed on Oct. 31, 1977, now U.S. Pat. No. 4,109,113; Fenton et al, Ser. No. 847,216, filed on Oct. 31, 1977, now U.S. Pat. No. 4,150,259; Fenton et al, Ser. No. 847,217, filed on Oct. 31, 1977, now U.S. Pat. No. 4,150,257, and Nahabedian Ser. No. 847,215, filed Oct. 31, 1977, now U.S. Pat. No. 4,125,748. These four patents are incorporated by reference as though they were each reproduced in their entirety herein.

Call processing in the system is under the control of microprocessor 15 in common control 14. Each station, such as Station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus 101 to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals—low-pitched tone ringing to indicate incoming CO calls and high-pitched tone ringing to indicate incoming station-to-station (intercom) calls.

Nonbutton key sets can be used as station positions where only station-to-station (intercom) calling and/or outward dialing, via dial access pooled facilities or a central answer position, are required. In this implementation the first (lower) 4 buttons on each MET station set are always the same. They are: Hold, +/−, and two system access buttons, each associated with the intercom number of the particular station. The +/− feature is described in the aforementioned patent application of Fenton et al, Ser. No. 847,216. The system access buttons are used to receive calls from other stations within the communication system (intercom) and to originate such calls or to access system facilities such as lines, paging ports, etc. Incoming calls may terminate on either system access button depending on their busy/idle status. If the lower one is busy, a second incoming call comes to the second (upper) one, giving a visual call waiting indication accompanied by a single audible ring if the station is off-hook. The system access buttons are also used in conferencing and call transfer features such as described in the aforementioned patent application Nahabedian et al, Ser. No. 847,215. The remainder of the buttons on the MET station sets are flexible buttons and can be assigned to any of the button-activated station or answering position features, such as call coverage, as shown in the aforementioned patent application of Fenton et al, Ser. No. 847,217; and pooled line treatment, as shown in the aforementioned patent application of Allison et al, Ser. No. 847,214.

As shown in FIG. 1 there are three pairs of wires coming out of the electronic key telephone set to the interface unit: T&R, data in, data out. The T&R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly. System facilities, such as system facility 10, is understood to include origination registers, tone circuits, stations, lines, trunks or any port which can be communication coupled to a link of the network.

Common control 14 consists of processor 15, interface units 17 and 18 the memory 16. The memory unit consists of a program store 16-1, and a data store 16-2. The data store is subdivided into the following:

A. Translation which contains the hardware configuration data. For example, the button assignments and station class of service.
B. Status which stores the state of the system at a given moment. For the station, it contains
  (a) Station state: switchhook; +/− operation; whether actively connected to the network or not.
  (b) Button state: for each button
    (i) if I-USE is on
    (ii) what is the green status LED state
    (iii) which link is associated with calls on this button.
C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets a flag and returns to the interrupted task which in turn will relinquish control to TSK-DSP control, as soon as it reaches a convenient break point. The task dispenser decides which task is to be executed next according to a schedule. Basically these tasks fall into three categories:

(1) Scan: Scan for physical changes (e.g., a new button depression by a station). If a change is detected and confirmed, it will be stored in a temporary buffer to be processed later.
(2) Process: After all scans are completed, changes will be processed.
(3) Maintenance: If there is time left in the 25 MS cycle, the system will perform routine maintenance functions until the next work cycle begins.

The following features can be implemented by the system discussed herein.

I-USE INDICATION

Figure 2:
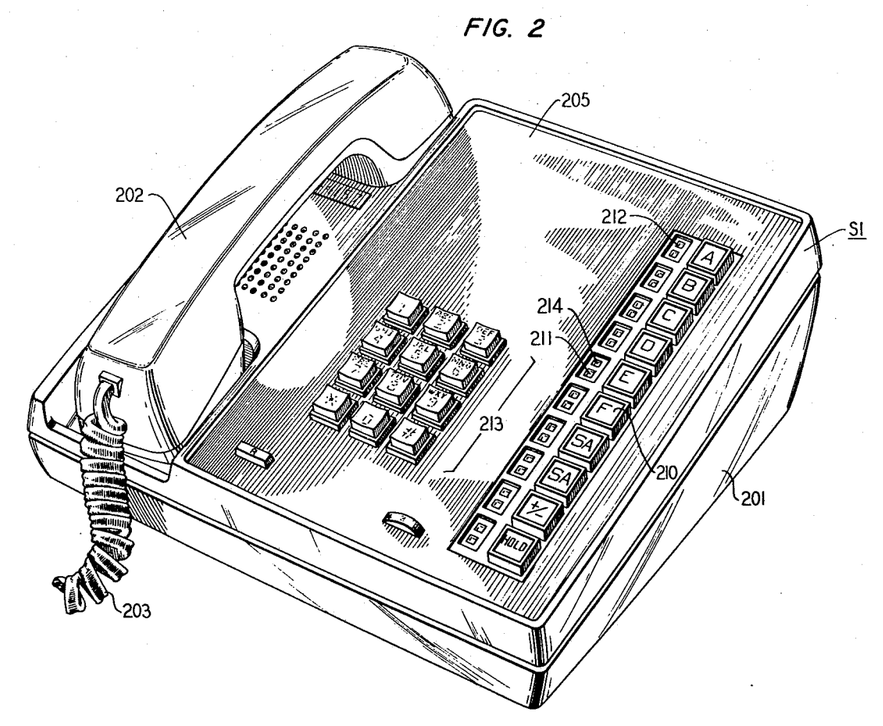
FIG. 2 shows a pictorial representation of a multibutton telephone station set.

This feature provides a red I-Use LED, such as LED 212, FIG. 2, associated with each line access button (tracking feature, system access, pooled facilities access, personal line access, automatic intercom, and call coverage). When off-hook, this LED indicates the line to which the station is connected. When on-hook, this LED indicates the line to which the station would be connected upon going off-hook.

LINE STATUS INDICATION

Call status indications are given by means of a green status LED such as LED 211, FIG. 2, associated with each line access button (tracking feature, system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

AUTOMATIC INTERCOM

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may answer the call by depressing the automatic intercom button and going off-hook.

CALL COVERAGE

Call coverage is associated with a group. Each station as the option of being a sender into a given group. As a sender that station's calls may be answered by coverage buttons associated with that group. In addition, each station has the option of being a coverage position for one or more groups—one equipped with a COVR button (or buttons) to answer calls directed from senders into the group (or groups). The status LED associated with a COVR button at each coverage station flashes whenever a station-to-station or attendant extended call is ringing at a sender station into the group. Call coverage is provided to personal line calls only if the principal station (the single station designated principal owner of that personal line) is a sender for the group. If a coverage station answers the call by depressing COVR and going off-hook, the associated status LED will indicate busy and all other COVR buttons will go idle (free to track new calls). The sender station whose call was answered will also receive a busy status indication on the line that was ringing, and it may bridge onto the call at any time by selecting that line.

If two or more eligible calls are ringing within the coverage group, the first coverage button of this group on a station will track whichever call was first to start ringing, the second coverage button of this group on the same station, if it exists, tracks the second call, etc. If calls directed to a station have no idle button appearance on which to terminate, busy tone will be given to the caller and this feature will not be invoked.

A station may cover for several groups by having a separate call coverage button for each group; however, a station can only send into one group. Each coverage group may have up to 8 coverage positions (i.e. 8 coverage buttons may be defined to any given group).

PLUS-MINUS CONFERENCE

By means of the plus/minus button, any station user may combine up to four separate calls into a single conference call-provided no more than two outside calls are involved. The conference may be established by placing and holding each individual call and then adding them together upon reaching the final party. Alternatively, idle lines may be added directly to the active call. Adding a held or idle line to an active call is achieved by depressing the plus/minus (+/−) button and then depressing the held or idle line button. All line appearances associated with an active conference have busy status and active I-use (red LED) indications. Any attempt to add a sixth party to the conference will be ignored by the system.

The station user may hold a conference (without breaking the talking path between the held parties) by depressing the HOLD button, and may reenter a held conference by depressing the line button associated with any of the held parties. The originator of a conference may selectively drop an active conferee by depressing the plus/minus button and then depressing the line button of the party to be dropped. Hanging up or selecting another line while active on a conference will terminate the station user's participation in the conference and transfer supervision to other internal stations associated within the conference. If no other internal station is available to assume supervision, the call is terminated unless there is a progress tone (ringback, busy, reorder) on the call.

The status LED associated with the plus/minus button is lighted whenever the plus/minus button is activated and is extinguished by any subsequent line button depression—including plus/minus and the switchhook.

DISTINCTIVE ALERT

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time.

MANUAL EXCLUSION

This feature allows the station user equipped with an exclusion button to exclude the answering position and others from bridging onto an existing call and also drops those stations already on the call. This feature may be cancelled manually by a second depression of the exclusion button permitting bridging, or canceled automatically by going on-hook. The manual exclusion status LED is lighted steadily whenever the feature is active on a nonheld call. When the call is held, exclusion remains in effect and the status LED of the exclusion button winks until the call is reentered by the holding party. This feature can be applied to only one call at a time. Stations excluded from a call hear silence and can receive no I-use indication on the excluded line.

After this feature is activated, the controlling station may use the conference feature to add selected internal stations into an "excluded" outside call. However, other stations cannot add any parties to this call.

PERSONAL LINE ACCESS

This feature provides a communications channel between a station user and a dedicated outside line via the switching network. Unlike pooled facilities, which can also be accessed by dial codes, personal lines are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

POOLED FACILITIES—BUTTON ACCESS

Upon depressing a pooled facilities access button and going off-hook, the station user is connected to an idle line facility belonging to a common pool of outside lines (e.g., CO, FX, WATS, etc.). The status and I-use LEDs associated with the pooled facilities access button will light steadily, and the station user will be free to complete the call. If no idle facilities are available (facilities busy indication), a user's attempt to originate will simply be denied and the I-use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

FACILITIES BUSY INDICATION

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

POOLED FACILITIES—DIAL ACCESS

Upon selecting an idle system access button and dialing the appropriate access codes (9 or 10X), a station user will be connected to an idle line facility belonging to a common pool of outside lines (e.g., CO, FX, WATS, etc.). The status and I-Use LEDs associated with the system access button will be lighted, and the station user will be free to complete the call. If no idle facilities are available, the user's attempt to originate will be denied and reorder tone will be given. This feature is intended for nonbutton sets and MET sets not provided with an appropriate pooled facility button.

PRIME LINE PREFERENCE

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

RINGING LINE PREFERENCE

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be canceled on any subsequent call until the user returns to the on-hook state. If ringing ceases while the station user is still on-hook, line preference reverts to whichever option is applicable—no line or prime line.

STATION CALL TRANSFER

By means of the plus/minus button, any station user may transfer any call to any station. Transfer may be achieved by holding the call to be transferred, placing a call to the desired station, depressing the plus/minus button, depressing the button associated with the held call, and then hanging up. Alternatively, an idle button may be plussed directly to the active line, after which the desired party may be dialed. A call transferred from one station to another and left in the ringing state for more than 120 seconds will be terminated if the transferring station is no longer active. This prevents an unmonitored transferred call from indefinitely tying up the system and the CO facilities.

STATION-TO-STATION CALLING

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611 issued May 2, 1972 in the name of Knollman et al, and in U.S. Pat. No. 4,046,972 issued Sept. 6, 1977 in the name of Huizinga et al, which patent also shows the multibutton electronic set, which patent describes the items designated by number in FIG. 2. The switching network and line circuits shown in FIG. 1 can be of the type shown in U.S. Pat. Nos. 3,991,279 and 3,991,280, both issued Nov. 9, 1976, and in copending application of J. J. Shanley, Ser. No. 846,162, filed on Oct. 27, 1977, now U.S. Pat. No. 4,110,566.

GENERAL DESCRIPTION

In the status memory (FIG. 1, item 16-2) there is stored for each button on each station set the following information:

(a) the instantaneous state of each LED (on/off) for the two LEDs associated with the button;

(b) the long term state of each LED (flash, wink, on, off). This is called the Station Button Status (SBS) for the status LED and the Station Button Iuse (SBI) for the Iuse LED.

Also, for each station set, there is a status memory location for recording:

(c) the last detected instantaneous state of the station's switch-hook (SSH) and buttons;

(d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switch-hook and buttons.

The returned data is compared with that in (c) above and if there are any changes, records these in a temporary buffer for that station. At a different time, another processor action called Process picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical forms, e.g., a value of 1 identifies a personal line button, a value of 2 identifies a pooled line button, 3 identifies a track button, etc.

For a speech-type button (e.g., system access, autointercom, personal line, pooled line, call coverage, etc.), there are 4 possible states which will be shown to the user on the status LEDs: Namely, busy—(LED steady on), idle—(LED dark), ring—(LED flash), hold—(LED wink).

This information is stored in the status data memory (16-2 in FIG. 1) coded in numerical forms. For a non speech-type button like message-waiting, the same data format is used although the valid states may reduce to 2 (busy and idle).

As described, the scan routine in the system detects and reports a button push by the MET user to a buffered area to wait for the process routines to process. When such a change is processed by the process routines, the button identification information, SBID, stored in 16-2 is first checked, then the button status information, SBS, stored in 16-2 is checked. The processor is thus able to interpret the button push to a specific user command and uses the proper programs stored in 16-1 to process the change. For example, button selection of (1) an idle (from SBS) seech-type (from SBID) button implies call origination requiring the associated facilities.

(2) a ringing (from SBS) speech-type (from SBID) button implies answer a ringing call.

GENERAL DESCRIPTION—TRACKING FEATURE

Figure 3:
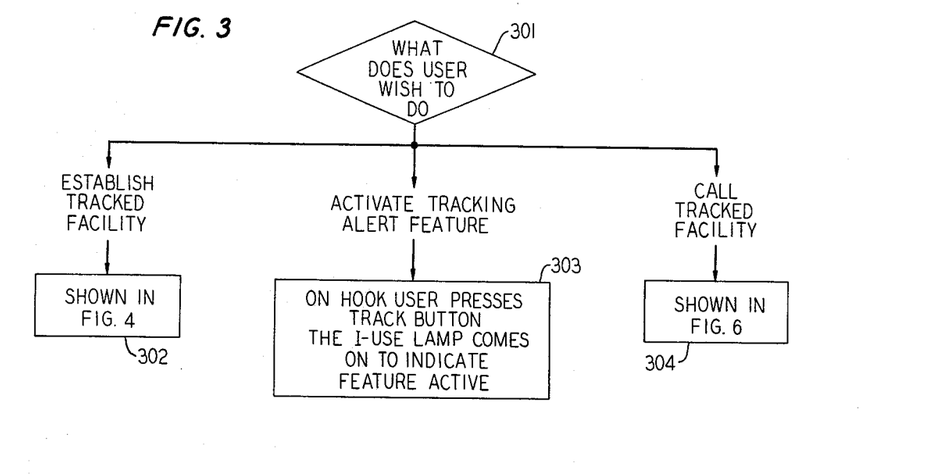
FIGS. 3, 4, 5 and 6 show typical flow charts of the claimed feature operation.

The following discussion is made with respect to FIG. 3 and shows the overall operation of the track feature.

In FIG. 3, the user takes one of three actions: Establish a tracked facility; activate the track feature; call the tracked facility. The term "establish a tracked facility" means that the station user informs the system of the facility to be tracked. This step is detailed below and in FIG. 4. In response, the system will provide a continuous visual indication of the tracked facility to the user. This provision of visual status information is done by the task described below in reference to FIG. 5.

The term "activate the track alert feature" means that the station user informs the system of a desire to receive an audible alert on every busy to idle transition of the established tracked facility. The method of activation is described below with respect to step 303. The method used by the system to alert the user is described below in the description of FIG. 5.

The term "call a tracked facility" means placing a call to a tracked station or seizing other tracked facilities. This step is described in detail below in reference to FIG. 6.

Figure 4:
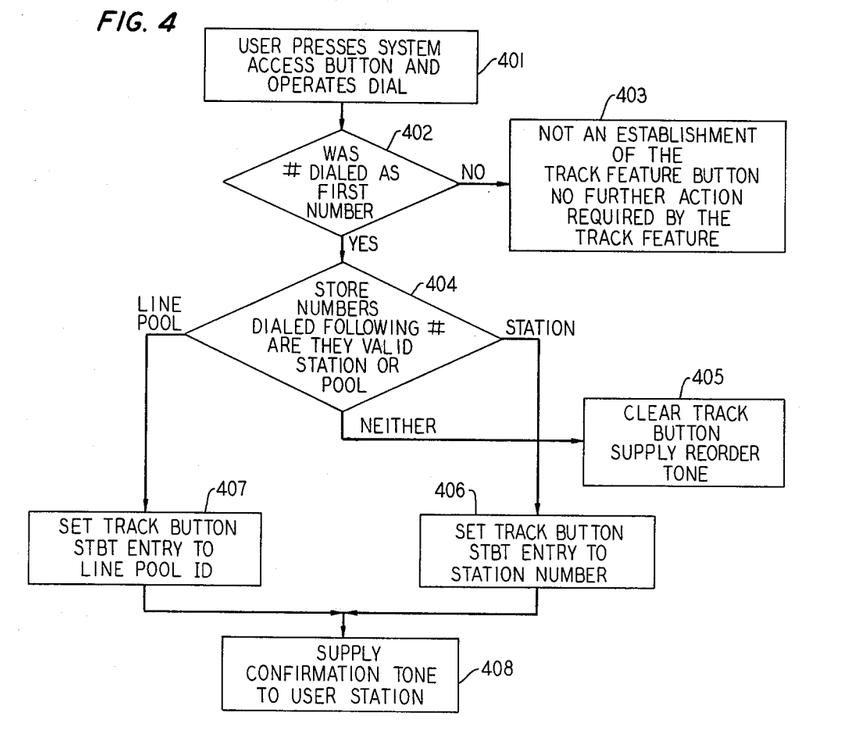
Figure 5:
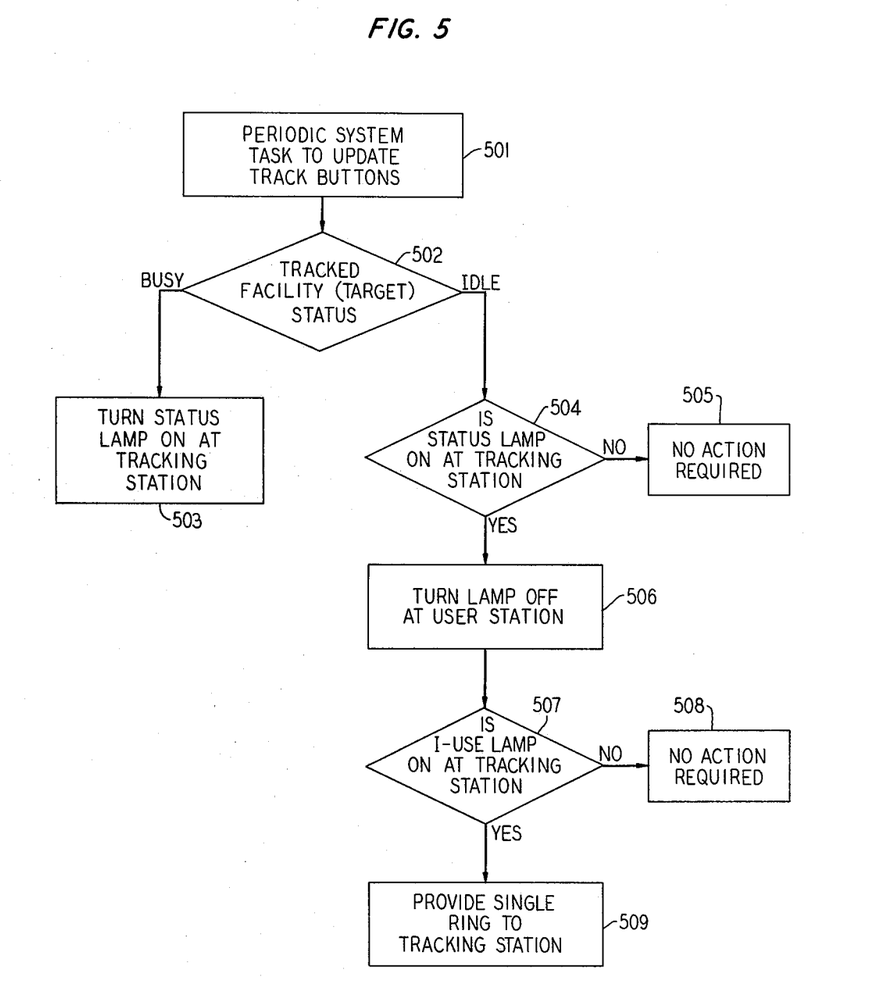
Figure 6:
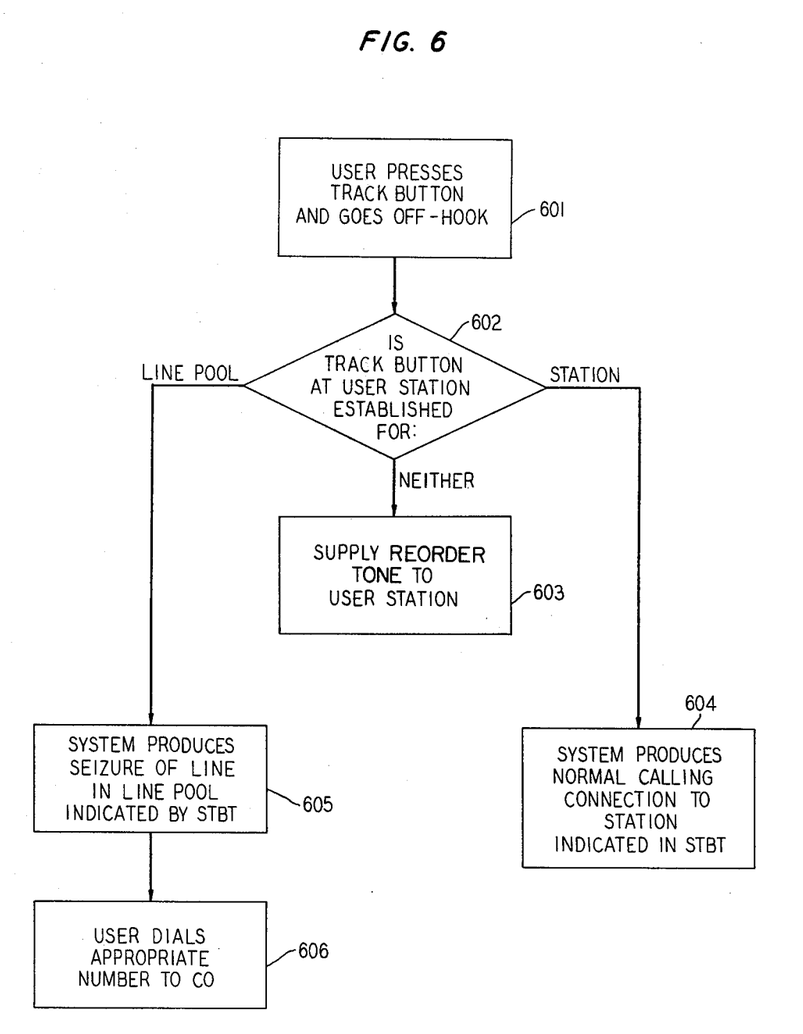

FIGS. 4, 5 and 6 and step 303 constitute the detailed description of the tracking feature operation. Before discussion of these FIGURES it should be noted that the following tables must be established in status memory 16-2, namely: SBS, SBI, SSH, and SBID which are described above, and STBT, which is a record containing the type and identity of the tracked facility for each track button. This record is kept on a per station basis, and a limit of one track button is imposed.

These tables are related as follows: The SBID table contains the type of each button in the system. Knowing the station which has a track button, the STBT table contains the tracked facility identification. The SBS and SBI contain lamp state information for the button.

The detailed description consists of four parts. There are three user actions which are described by step 303 (FIG. 3), FIG. 4, and FIG. 6. A periodic system function is described by FIG. 5.

ESTABLISHING A TRACKED FACILITY

In step 401 (FIG. 4) the user originates a call in the normal manner by pressing a system access button and going off hook.

In step 402 the first digit dialed is examined to see if it was a #. If it wasn't, then this is not an attempt at establishing a tracked station and is handled as some other type of call.

In step 404 the number dialed after the # is examined to determine if it is a valid station number or pooled line access code. If it is not, then in step 405 an entry in the STBT (station track button table) is cleared and reorder tone is supplied to the user. If it was a valid station number step 406 is next. If it was a valid line pool access code then step 407 is next.

In step 406 an entry is made in the STBT (station track button table) for the tracking user to indicate that a station is being tracked and also which station is being tracked.

In step 407 the STBT entry for the tracking station is set to indicate that a line pool is being tracked and also which line pool is being tracked.

In step 408 a tone is supplied to the user to indicate that a valid tracked facility has been stored in the system.

ACTIVATING THE TRACK ALERTING FEATURE

The user activates the track alerting feature in step 303. By pressing the track button while on-hook, the user causes the I-use LED associated with the track button to be turned on as described above in "Overall System Operation". The I-use lamp being on indicates to both the user (visually) and to the system (via SBI) that the track alert feature is active. This information is used by the system process "update track buttons" described below in conjunction with FIG. 5.

In step 501 (FIG. 5) the system activates a periodic task to update stations using the track feature.

This task searches the SBID table for track buttons, and for each track button, performs steps 502 through 509.

In step 502 the system determines the busy-idle status of the tracked or target facility indicated in the STBT table. For a station, busy is defined to be off hook at the station set and is determined from the SSH table. For a line pool, busy is defined as all lines in that pool being in use, and is determined by searching for an idle line in the line pool.

If the tracked facility is busy, then in step 503 the tracking station's status lamp (SBS) associated with the track button is updated to indicate a busy tracked facility. This would be lamp 211 in FIG. 2 (assuming button E to be the tracking button at station S1).

If the tracked facility is idle, then in step 504 the tracking station's status lamp (in SBS) associated with the track button is examined to determine the previous busy-idle state of the tracked facility. If the tracked facility was previously idle then nothing is done, since the lamp is in the proper state.

If the previous state of the tracked facility was busy then the status lamp associated with the track button (in SBS) is turned off in step 506. At this point it is known that a busy to idle transition of the tracked facility has just occurred.

In step 507 the state of the I-use lamp, lamp 214 FIG. 2, (assuming button E is the track button) associated with the track button at the tracking station is examined (using SBI). If lamp 214 is on, indicating that the tracking party preselected the track button, or equivalently, activated the track feature, then step 509 is performed.

In step 509 the tracking station is given an audible signal as an indication that the tracked facility just became idle.

It should be noted that if the tracking station does not go off-hook or select another button, then on subsequent off-hook to on-hook transitions of the tracked station (or subsequent busy to not-busy condition of the line pool), another audible tone will be provided to the tracking station.

CALLING A TRACKED FACILITY

In step 601 the user presses the track button and goes off-hook to request calling the tracked facility.

In step 602 the system examines the STBT entry for the station to determine what facility is being tracked. Depending on the entry, step 603, 604 or 605 is done next.

In step 603 the system connects the user to reorder tone because the track button is not tracking any facility.

In step 604 the system places a call to the tracked station, under control of the identification numbers stored in the STBT table. This call may result in ringing or busy tone depending on the condition of the tracked station. It is possible to have a busy condition of the tracked station since a caller may operate the track button at any time without regard to the state of the status lamp. Also, depending on the frequency of execution of the periodic update task (step 501, FIG. 5), the status lamp may not instantaneously track the busy-idle state of the tracked station.

In step 605 the system seizes a line in a line pool for the user. If none are available the request will be ignored (or, optionally, reorder tone could be returned). It is noted that this busy condition will not usually occur since the user could have determined that there were no lines available from the active state of the green status lamp associated with the track button.

It should be understood that while stations and line pools have been discussed as being the target facilities any system facility may be the subject of the tracking feature without departing from our invention.

It should also be understood that while the tracking feature has been implemented in an electronic telephone system, such a tracking feature may also be utilized in key telephone systems of the type described in U.S. Pat No. 3,840,710 and may or may not have assigned a separate tracking button at the calling station.

We claim:

1. A station tracking control arrangement for use in a communication system having a plurality of stations having communication capability among each other over communication links, said arrangement comprising means for determining the busy-idle status of each said station, means controlled from a first station for temporarily establishing in association with said first station a selected other station as a target station, means separate from said communication links for providing a first indication at said first station when said target station is busy, and means separate from said communication links for providing a second indication at said first station when said target station is idle.

2. The invention set forth in claim 1 wherein said first indication providing means is a first illuminated lamp and wherein said second indication providing means is a second illuminated lamp.

3. The invention set forth in claim 2 wherein said second indication providing means includes means for also enabling an audible signal at said first station.

4. The invention set forth in claim 1 wherein said communication system further includes means for establishing communication connections to pooled groups of system facilities, and wherein said determining means is also arranged for determining the busy-idle status of each said pooled group of facilities, said first station temporary establishing means includes means for establishing at said first station a selected one of said pooled facilities as a target facility, said first indication providing means includes means for providing said first indication when said target facility is busy, and said second indication providing means includes means for providing said second indication when said target facility is idle.

5. The invention set forth in claim 4 further comprising means for providing an audible signal to said first station, and means responsive to each determined idle condition of said target station or target pooled facility for enabling said audible signal at said first station.

6. The invention set forth in claim 5 wherein said first station has a plurality of nonlocking buttons each operable to establish communication connections to different ones of said stations or system facilities, and wherein each said button has associated therewith a visual indicating device, said visual indicating device of one of said buttons at said first station operable for providing said first indication when said temporarily selected target station or facility is busy, and means responsive to the selection of said one button from said first station and to said enabling of said audible signal at said first station for establishing a communication connection from said first station to said temporarily selected target station or system facility.

7. In a communication system where any one of a number of telephone stations may selectively communicate with any other one of said telephone stations or with system facilities over communication paths established between a calling and called one of said stations or system facilities, the improvement comprising means at a calling one of said stations for selecting a called station or facility to which a call is to be directed, means responsive to a selection at said calling station for establishing a communication connection to said selected called station or facility, means for storing the busy-idle status of said called station or called facility, means for providing visual signals to said calling station, means for receiving special signals from said calling station, means responsive to receipt of one of said special signals from said calling station followed by selection at said calling station of a called one of said stations or facilities for inhibiting the establishment of said communication connection to said called station or facility, means concurrently enabled with said inhibiting means for examining the stored busy-idle status of said called station or facility, and means for enabling said visual signals at said calling station when said stored status of said called station or facility is determined busy.

8. The invention set forth in claim 7 further comprising means controlled by each busy to idle transition of said called station or facility for changing said visual signals at said calling station.

9. The invention set forth in claim 8 further comprising means concurrently enabled with said inhibiting means for storing paired identities of said calling station and said called station or facility, means operative under control of said calling station for removing the paired identities of said calling station and said called station or facility from said store, and means controlled by the continued storage of said calling and called paired station identities in said store for providing said visual signals to said calling station when said called station or facility is busy and for changing said visual signals at said calling station each time said called station or facility is busy.

10. The invention set forth in claim 9 further comprising means for providing an audible signal at said calling station, and means controlled by a busy to idle transition of said called station or facility for enabling said audible signal at said calling station.

11. The invention set forth in claim 10 wherein said called facility is a line pool.

12. The invention set forth in claim 11 further comprising means for determining said line pool busy when all of said lines in said pool are busy and means for determining said line pool idle when at least one of said lines in said line pool is idle.

13. The invention set forth in claim 7 further comprising means controlled by the off-hook condition of said calling station and a busy to idle transition of said called station for establishing a communication connection to said called station or facility.

14. The invention set forth in claim 7 wherein more than one of said stations may be a calling station with respect to any called one of said facilities, further comprising means concurrently enabled with said inhibiting means for storing the identity of said called station or facility paired with the identities of all stations calling said called station or facility, and means controlled by each busy to idle transition of said called station or facility for changing said visual signals at all of said calling stations, paired with said called station or facility in said store.

15. In a communication system having a plurality of stations and system facilities, each station having a plurality of buttons and where each station may establish a calling connection to any other station or system facility by operation of one of said buttons and by selectively providing the called number identification of a called facility and where each said button has associated therewith at least one visual indicating device, the improvement comprising, a memory means for storing the busy-idle statuses of said system facilities in said memory, means for enabling said visual indicating device of a specific one of said buttons at a calling station, means for recognizing special dialing signals from said calling station, means responsive to recognition of a particular one of said special dialing signals from said calling station followed by receipt of a called facility identification number from said calling station for inhibiting the establishment of said calling connection to said facility, and means concurrently enabled with said inhibiting means for examining the stored busy-idle status of said called facility and for enabling said visual indicating device of said specific one of said buttons at said calling station when said stored status of said called facility is determined busy.

16. The invention set forth in claim 15 wherein said specific one of said buttons is a tracking button having first and second visual indicating devices uniquely associated therewith, and wherein said enabled visual indicating device is said first indicating device, further comprising means controlled by a busy to idle transition of said called facility for turning off said first visual indicating device of said tracking button.

17. The invention set forth in claim 16 further comprising means for providing a common audible signal at said calling station, means enabled by the operation of said tracking button while said calling station is on hook for turning on said second visual indicating device associated with said tracking button, and means controlled by each busy to idle transition of said called facility for enabling said common audible signal at said calling station when said second visual indicating device of said tracking button is turned on.

18. The invention set forth in claim 16 further comprising means concurrently enabled with said inhibiting means for storing paired identities of said calling station and said called facility, and means controlled jointly by the off hook condition of said calling station and the operation of said tracking button at said calling station while said identities are stored for establishing a calling connection to said called facility.

19. A method of tracking a called station in a communication system having a plurality of such stations each having communication paths therebetween, said method comprising the steps of determining the busy-idle status of each said station, temporarily establishing, under control from a first station, an association between said first station and a selected other station as a target station, providing, separate from said communication paths, a first indication at said first station when said target station is busy, and providing, separate from said communication paths, a second indication at said first station when said target station is idle.

20. In a communication system where any one of a number of telephone stations may selectively communicate with any other one of said telephone stations or with system facilities over communication paths established between a calling and called one of said stations or system facilities, the improved method comprising the steps of selecting at a calling one of said stations a called station or facility to which a call is to be directed, establishing in response to a selection at said calling station a communication connection to said selected called station or facility, storing the busy-idle status of said called station or called facility, providing special signals to said calling station, receiving special signals from said calling station, inhibiting in response to receipt of one of said special signals from said calling station followed by selection at said calling station of a called one of said stations or facilities, the establishment of said communication connection to said called station or facility, examining, concurrently with the enabling of said last step, the stored busy-idle status of said called station or facility, and enabling said special signals at said calling station when said stored status of said called station or facility is determined busy.

21. The invention set forth in claim 20 further comprising the step of changing said special signals at said calling station under control of each busy to idle transition of said called station or facility.

22. In a communication system having a plurality of stations and system facilities, each station having a plurality of buttons and where each station may establish a calling connection to any other station or system facility by operation of one of said buttons and by selectively providing the called number identification of a said called facility, the improved method comprising the steps of storing the busy-idle statuses of said stations and system facilities in a memory, recognizing special dialing signals from said calling station, inhibiting the establishment of said calling connection to a called station or facility in response to recognition of a particular one of said special dialing signals from said calling station followed by receipt of a called station or facility identification number from said calling station, examining, concurrently with the enabling of said inhibiting step, the stored busy-idle status of said called station or facility, and enabling a visual indication at said calling station when said stored status of said called station or facility is determined busy.

23. The invention set forth in claim 22 further comprising the step of turning off under control of a busy to idle transition of said called station or facility, said calling station indication.

* * * * *